United States Patent [19]

Antkowiak

[11] 4,021,959
[45] May 10, 1977

[54] FISHING LURE

[76] Inventor: Chester A. Antkowiak, 201 Willett St., Buffalo, N.Y. 14206

[22] Filed: Aug. 18, 1976

[21] Appl. No.: 715,292

[52] U.S. Cl. .................................. 43/41; 43/42.74
[51] Int. Cl.² ...................................... A01K 97/04
[58] Field of Search ................ 43/17.5, 26.1, 26.2, 43/41, 42.74, 42.19, 42.2, 42.21, 42.35, 42.46, 42.02, 42.03, 2

[56] References Cited

UNITED STATES PATENTS

| | | | |
|---|---|---|---|
| 1,533,022 | 4/1925 | Mead | 43/42.19 |
| 2,763,954 | 9/1956 | Bunker | 43/42.74 |
| 3,023,533 | 3/1962 | Bertram | 43/41 |
| 3,079,721 | 3/1963 | Smith | 43/17.5 |
| 3,174,247 | 3/1965 | Morgan | 43/42.19 |
| 3,574,966 | 4/1971 | Sullivan | 43/26.1 |

FOREIGN PATENTS OR APPLICATIONS

| | | | |
|---|---|---|---|
| 184,363 | 8/1922 | United Kingdom | 43/42.46 |

*Primary Examiner*—Warner H. Camp
*Attorney, Agent, or Firm*—Sommer & Sommer

[57] ABSTRACT

A fishing lure includes a body member in the form of a transparent container in which a bait may be placed. The improvement provides a plurality of blades pivotally mounted on the container and severally adapted to freely move through an arc of approximately 180 degrees between two inoperative positions against the container. A hook member is mounted on the container for pivotal movement about an axis perpendicular to the pivotal axis of the blade. The hook member may be selectively moved to a concealed position against the container to allow the blade to freely pivot to either inoperative position as the lure is raised or lowered. Alternatively, the hook member may be moved to an extended position to hold the blade in an operative extended position for causing the container to rotate as the lure is raised. The blade may further include a metallic strip configured to capture and hold the blade on its extended position so that the container will be caused to rotate when the lure is both raised and lowered.

3 Claims, 5 Drawing Figures

U.S. Patent May 10, 1977 4,021,959
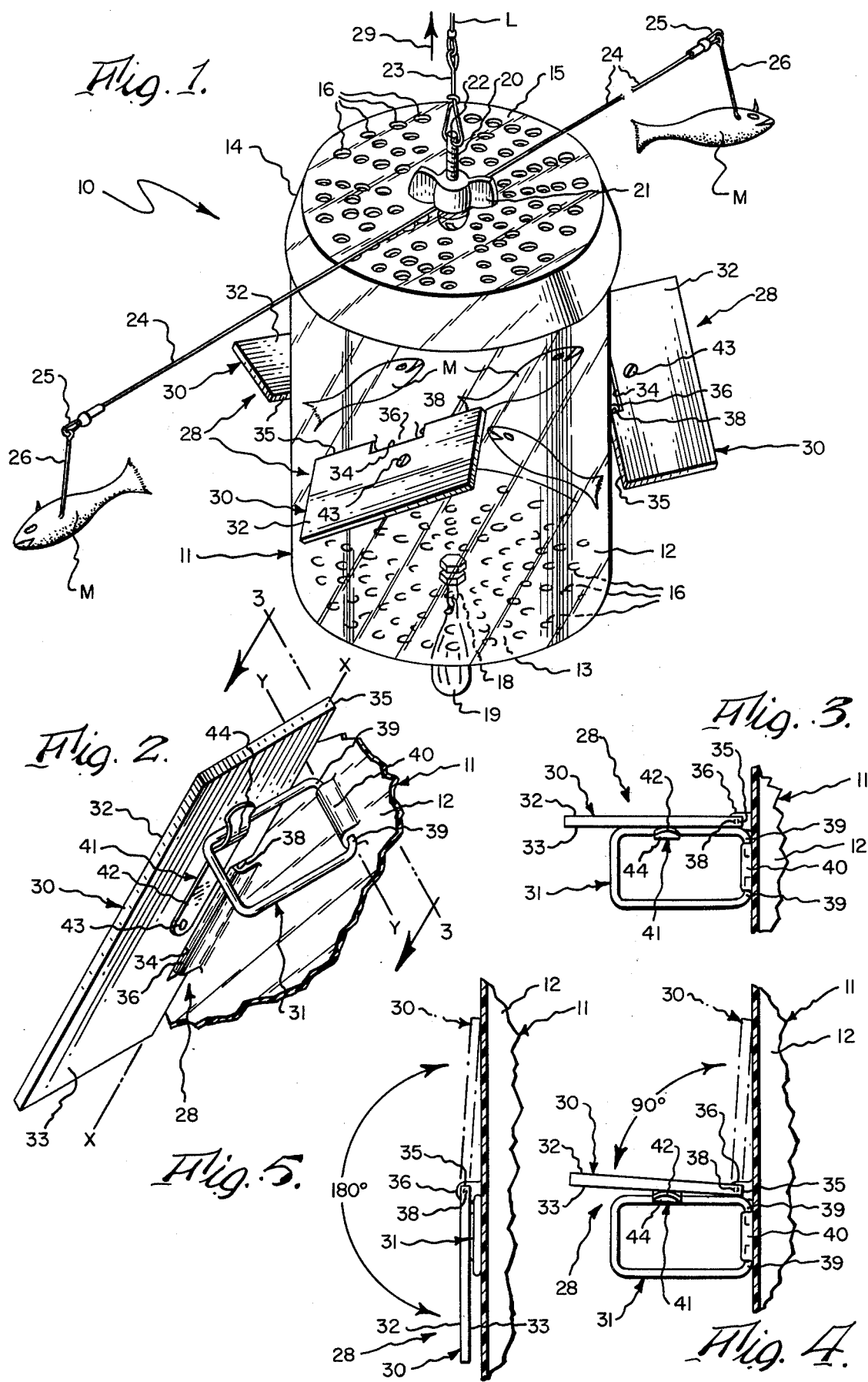

FISHING LURE

BACKGROUND OF THE INVENTION

1. Field of the Invention

The present invention relates generally to the field of fishing lures, and more particularly to an improved fishing lure which is adapted to simulate a school of minnows.

2. Description of the Prior Art

Many types of fishing lures have been developed. Some of these simulate a single minnow, or some other suitable bait, while other simulate a school of minnows.

Accordingly, details of previously developed lures are shown in the following U.S Pat. Nos. 1,038,866, 1,470,842, 2,742,730, 2,708,804, and 2,223,922.

SUMMARY OF THE INVENTION

The present invention provides an improvement for a fishing lure having a body member and adapted to be moved through a body of water in at least one direction.

The improvement comprises rotation means mounted on the body member and selectively operable to cause the body member to rotate when the lure is moved in such direction. The rotation means broadly includes at least one blade pivotally mounted on the body member about an axis inclined at an acute included angle to the direction of movement, and a hook member piviotally mounted on the body member proximate each blade. The blade is adapted to normally pivot to an inoperative position against the body member when the lure is moved in such direction. The hook member is adapted to be selectively moved to a concealed position against the body member to enable the blade to pivotally move to one of its inoperative positions against the body member. When the hook member is moved to its extended position, the blade is held in its operative extended position to cause the body member to rotate as the lure is moved in such direction through a body of water.

The inventive rotation means may further include catch means, preferably in the form of a metallic strip, mounted on the blades and adapted to receive and capture the hook member for holding the blade immovable at its operative extended position.

In the presently preferred embodiment, the pivotal axis of the hook member is perpendicular to the pivotal axis of the blade.

Accordingly, one general object of the present invention is to provide an improved fishing lure.

Another object is to provide an improved fishing lure which is adapted to simulate a school of minnows.

Another object is to provide an improved fishing lure having a body member which may be selectively rotated as the lure is moved directionally through a body of water.

Still another object is to provide an improved fishing lure having a body member which is adapted to be roatated as the lure is moved through a body of water, wherein the rotational characteristics of the body member may be adjusted.

These and other objects and advantages will become apparent from the foregoing and ongoing specification, the drawings, and the appended claims.

BRIEF DESCRIPTION OF THE DRAWINGS

FIG. 1 is a perspective exterior view of one form of an improved fishing lure incorporating the inventive rotation means, this view showing the body member in the form of a transparent container to which three blades and three associated hook members are pivotally mounted.

FIG. 2 is an enlarged fragmentary perspective view looking at the underside of one of the blades depicted in FIG 1, this view particularly illustrating the catch means mounted on the blade and capturing the hook member.

FIG. 3 is a fragmentary sectional view of the engaged blade and hook member, this view being taken on line 3—3 of FIG. 2 and generally tangential to the cylindrical body member.

FIG. 4 is a view generally similar to FIG. 3, showing the hook member in its extended position to prevent further counterclockwise movement of the blade, but arranged below the catch means to permit the blade to pivot upwardly through an arc of approximately 90°.

FIG. 5 is a view generally similar to FIG. 3, but showing the hook member in its concealed position to enable the blade to freely pivot through an arc of approximately 180° between its lower inoperative position (shown in solid) and its upper inoperative position (shown in phantom).

DESCRIPTION OF THE PREFERRED EMBODIMENTS

At the outset, it should be clearly understood that like reference numerals are intended to identify the same elements and/or structure consistently throughout the several drawing figures, as such elements and/or structure may be further described or explained by the entire written specification of which this detailed description is an integral part.

Referring initially to FIG. 1, the present invention provides an improvment for a fishing lure, generally indicated at 10, having a body member, generally indicated at 11.

In this embodiment, the body member 11 is shown as being a substantially cylindrical transparent container, made of a suitable glass or plastic material, having a cylindrical side wall structure 12, an upper open mouth (not fully shown), and a planar circular bottom 13. The open mouth of this container is adapted to be closed by a transparent cover 14, preferably of similar material, having a depending peripheral skirt arranged to embrace a marginal portion of side wall structure 12 about the container's open mouth. In the well known manner, the cover 14 may be either threaded or snapped into engagement with the container to prevent unintended separation of these two elements. Moreover, the cover 14 is shown as having a planar horizontal circular top portion 15.

Persons skilled in this art will readily appreciate that the transparent body member 11, including the assembled container and cover, is adapted to receive therein, a suitable untethered bait, such as live minnows M. To this end, the cover top portion 15 and the container bottom portion 13 are severally provided with a large plurality of openings on perforations 16 to allow water to freely enter and exit the confinement chamber provided within the assembled container.

The bottom 13 may be suitably provided with a depending eye or swivel 18, to which a sinker 19, or equivalent, may be optionally attached, if desired.

The cover top portion 15 is provided with a central vertical through-hole (not shown) such that the treaded shank portion 20 of a suitable headed fastener may penetrate this opening to receive a wing nut 21. Thus, wing nut 21 may be selectively tightened to securely hold this fastener to the cover. Also, the fastener shank portion 20 is shown further provided with a diametrical through-hole 22 to receive a swivel 23 attached to the fisherman's line L.

The fishing lure illustrated is adapted to simulate a school of minnows, and may further include a plurality of wire spokes, severally indicated at 24, which extend radially outwardly from their central connection with fastener shank portion 20. While only two of these spokes 24 are shown in FIG. 1, it should be clearly understood that these spokes may be provided in a greater number, and in different lengths, as desired. The ooutboard or distal ends of these spokes are shown provided with suitable snaps or swivels 25 to receive hooks, leaders, or snelled hooks, indicated at 26, as desired.

Therefore, the illustratd fishing lure is adapted to simulate a small school of minnows, with some live minnows swimming freely within the transparent container, and with other minnows being tethered to the ends of spokes 24. Persons skilled in this art will appreciate that while this fishing lure is particularly suited for still fishing, it may be jigged or slowly trolled as well.

The improvement according to the present invention provides rotation means, generally indicated at 28, mounted on the body member 11 and selectively operable to cause the body member to rotate when the lure 10 is moved through a body of water in one direction, this direction being vertically upward in FIG. 1, in the direction of the arrow 29 and generally parallel to the line L.

The rotation means 28 includes at least one blade 30 pivotally mounted on the body member 11, and hook member 31 also pivotally mounted on the body member 11.

As best shown in FIG. 2, each blade 30 is elongated, substantially rectangular member having upper and lower planar surfaces 32, 33, respectively. Each blade is provided with a rectangular notch 34 extending outwardly into the blade body from its innermost elongated end face 35, to receive therein a convex lug 36 extending radially outwardly from the container side wall. A pin 38 extends outwardly from weiter end of this lug 36 and is received a proximate portion of the blade. The blade is therefore mounted for pivotal movement about the longitudinal axis of pin 38, such axis being indicated as $x-x$ in FIG. 2. Adverting now to FIG. 1, the pivotal axis of each blade is shown inclined at an acute included angle to the vertical upward direction of movement.

Therefore, as best shown in FIG. 5, each blade 30 is pivotally mounted on the body member 11 at an acute included angle, nominally about 45°, to the vertical upward direction of movement, and is adapted to freely pivot between an upper inoperative position (shown in phantom) as the lure is lowered, or to a lower inoperative position (shown in solid) as the lure is raised, such pivotal movement of the blade between these two extreme inoperative positions inscribing an arc of approximately 180°. In either of these inoperative positions the blade will lie against the body member.

Adverting now to FIG. 2, the hook member 31 is shown as being a wire-like member bent into a substantially U-shaped form with marginal portions 39 adjacent its distal ends inturned to face one another. These in-turned marginal portions 39 are shown as being received in a convex lug 40 extending outwardly from the container side wall. In this manner, the hook member is mounted on the body member for pivotal movement about the axis of such in-turned marginal portions 39, 39, this axis being indicated at $y-y$ in FIG. 2. Moreover, persons skilled in this art will appreciate that the pivotal axis $x-x$ of the blade, and the pivotal axis $y-y$ of the hook member are arranged at a right angle so that the hook member may be moved outwardly to an extended position to engage the underside of the blade.

If desired, the inventive rotation means 28 may further include catch means, generally indicatad at 41, mounted on each blade to engage the hook member for holding the blade immovable at its operative extended position shown in FIGS. 2 and 3. To this end, the catch means 41 is shown as being an elongated metallic strip 42 having one end portion secured to the underside of the blade by a suitable fastener 43, and having a transversely-extending U-shaped trough or depression 44 formed in its opposite end portion. While the upper surface of this metallic strip 42 normally engages the lower surface of the blade, persons skilled in this art will appreciate that this strip may flex or bend to admit the upper bar of the hook member into the trough 44. Preferably, the metallic hook member 31 and strip 42, as well as any other metallic parts of lure 10, are formed of suitable non-rusting material, such as stainless steel, brass, or the like.

As previously noted, the improved fishing lure illustrated and described is adapted to simulate a school of minnows. To this end, the inventive rotation means 28 functions to selectively cause the body member 11 to rotate, as desired.

The hook member 31 may be associataed with the blades 30 in any of the three relationships depicted in FIGS. 3-5, as desired.

IN FIG. 3, the hook member 31 is shown as having been selectively moved to an outwardly extending position, with the upper bar of the hook member captured by the catch means between strip trough 44 and the bottom surface 33 of the block. In this relationship, the blade will be held in its operative outwardly-extended position such that the body member 11 will be caused to rotate as the lure is either raised or lowered.

In FIG. 4, the hook member 31 is also shown as having been selectively moved to its outwardly-extended position, as in FIG. 3. However, in this second relationship, the hook member is simply placed beneath the catch means so that the blade may pivot upwardly to lie against the container, or pivot downwardly to abut the hook member, such movement inscribing an arc of approximataely 90°. Thus, when the lure is moved downwardly, the blade may pivot upwardly to the upper inoperative position such that the blade will lie against the container. However, when the lure is moved upwardly, the blade may pivot downwardly to abut the outwardly-extended hook member. Hence, in the relationship depicted in FIG. 4, the body member will be caused to rotate as the lure is raised through a body of water, but may be lowered without substantial rotation.

Finally, in FIG. 5, the hook member 31 is shown as having been moved to its concealed position against the body member, such that the blade may freely pivot between its upper and lower inoperative positions, such movement inscribing an arc of approximately 180°. Hence, in this relationship, the lure may be raised and lowered in a body of water without imparting substantial rotation to the body member.

Accordingly, the present invention broadly provides rotation means mounted on the body member and selectively operable to cause the body member to rotate when the lure is moved in one direction. The rotation means includes at least one blade pivotally mounted on the body member about an axis inclined at an acute included angle to the direction of movement, and the blade is adapted to normally pivot to an inoperative position against the body member when the lure is moved in this direction. The rotation means further includes a hook member pivotally mounted on the body member proximate each blade, and this hook member is adapted to be selectively moved to a concealed position against the body member to enable the blade to pivot to its inoperative position, and is adapted to be selectively moved to an extended position to engage the blade and to prevent the blade from moving to its inoperative position.

Therefore, while a preferred embodiment of the present invention has been shown and described, persons skilled in this art will understand that various changes and modifications may be made without departing from the spirit of the invention, which is defined in the following claims.

What is claimed is:

1. In a fishing lure adapted to be moved through a body of water in at least one direction, and having a body member, the improvement which comprises:
   rotation means mounted on said body member and selectively operable to cause said body member to rotate when said lure is moved in said one direction, said rotation means including
   at least one blade pivotally mounted on said body member about an axis inclined at an acute included angle to said one direction, said blade being adapted to normally pivot to an inoperative position against said body member when said lure is moved in said one direction; and
   a hook member pivotally mounted on said body member proximate each blade, said hook member being adapted to be selectively moved to a concealed position against said body member to enable said blade to pivot to said inoperative position, and adapted to be selectively moved to an extended position to engage said blade and to prevent said blade from moving to said inoperative position against said body member,
   whereby, when said hook member is moved to said extended position, said blade may be held in an operative extended position to cause said body member to rotate as said lure is moved in said direction.

2. The improvement as set forth in claim 1 and further comprising:
   catch means mounted on said blade to receive said hook member for holding said blade immovable in said operative extended position.

3. The improvement as set forth in claim 1 wherein the pivotal axis of said hook member is perpendicular to the pivotal axis of said blade.

* * * * *